(12) United States Patent
Mercat et al.

(10) Patent No.: US 7,658,450 B2
(45) Date of Patent: *Feb. 9, 2010

(54) WHEEL WITH TENSION SPOKES AND A METHOD OF MANUFACTURING SUCH WHEEL

(75) Inventors: Jean-Pierre Mercat, Chavando (FR); Fabrice Augris, Cusy (FR)

(73) Assignee: Salomon S.A.S., Metz-Tessy (FR)

( * ) Notice: Subject to any disclaimer, the term of this patent is extended or adjusted under 35 U.S.C. 154(b) by 58 days.

This patent is subject to a terminal disclaimer.

(21) Appl. No.: 11/518,434

(22) Filed: Sep. 11, 2006

(65) Prior Publication Data

US 2007/0063574 A1    Mar. 22, 2007

(30) Foreign Application Priority Data

Sep. 16, 2005  (FR) .................................. 05 09501
Dec. 21, 2005  (FR) .................................. 05 13086

(51) Int. Cl.
*B60B 1/04* (2006.01)
(52) U.S. Cl. .......................... 301/55; 301/59; 301/104; 301/110.5; 29/894.33
(58) Field of Classification Search .................. 301/55, 301/56, 57, 58, 59, 61, 73, 74, 104, 110.5, 301/60; 29/894.33, 894.331, 894.332, 894.333
See application file for complete search history.

(56) References Cited

U.S. PATENT DOCUMENTS

| 277,252 | A | * | 5/1883 | Ferguson | 301/60 |
|---|---|---|---|---|---|
| 384,650 | A | * | 6/1888 | Stribling | 301/60 |
| 556,125 | A | * | 3/1896 | Wolff | 301/60 |
| 689,371 | A | * | 12/1901 | Stutsman | 301/60 |
| 695,448 | A | * | 3/1902 | Evans | 301/60 |
| 1,153,919 | A | * | 9/1915 | Hopkins | 301/60 |
| 1,340,773 | A | * | 5/1920 | Jinkner | 301/35.58 |
| 1,862,804 | A | * | 6/1932 | Pugh | 301/55 |
| 1,910,164 | A | * | 5/1933 | Horn | 301/54 |
| 2,937,905 | A | | 5/1960 | Altenburger | |
| 3,977,453 | A | | 8/1976 | Coran et al. | |
| 4,602,823 | A | * | 7/1986 | Berg | 301/32 |
| 5,064,250 | A | | 11/1991 | Yashiro et al. | |
| 5,104,199 | A | | 4/1992 | Schlanger | |

(Continued)

FOREIGN PATENT DOCUMENTS

EP          0872357          10/1998

(Continued)

OTHER PUBLICATIONS

Sharp, Archibald, "Bicycles & Tricycles—An Elementary Treatise on Their Design and Construction," pp. 342, 343, The MIT Press, Cambridge, Massachusetts, 1896.

*Primary Examiner*—Russell D Stormer
(74) *Attorney, Agent, or Firm*—Greenblum & Bernstein P.L.C.

(57) ABSTRACT

A wheel including a peripheral rim, a central hub, and spokes connecting extending and tensioned between the rim and the hub, as well as a method for manufacturing such a wheel. The method includes distributing the spokes in two groups, a first group of spokes lacking a tensioning device, and a second group of spokes having a tensioning device; assembling the spokes to the rim and to the hub, and then adjusting the tension of the spokes with tensioning devices of the second group of spokes.

30 Claims, 8 Drawing Sheets

U.S. PATENT DOCUMENTS

| | | | |
|---|---|---|---|
| 5,110,190 A * | 5/1992 | Johnson | 301/55 |
| 5,228,756 A * | 7/1993 | Krampera | 301/58 |
| 5,540,485 A | 7/1996 | Enders | |
| 5,707,114 A | 1/1998 | Schlanger | |
| 6,010,197 A * | 1/2000 | Crosnier et al. | 301/59 |
| 6,036,281 A | 3/2000 | Campbell | |
| 6,189,978 B1 | 2/2001 | Lacombe et al. | |
| 6,224,165 B1 | 5/2001 | Mercat et al. | |
| 6,375,273 B2 | 4/2002 | Pont | |
| 2006/0181140 A1 | 8/2006 | Mercat et al. | |
| 2006/0197370 A1 | 9/2006 | Mercat et al. | |
| 2007/0046097 A1 | 3/2007 | Mercat et al. | |

FOREIGN PATENT DOCUMENTS

| | | |
|---|---|---|
| EP | 1044827 | 10/2000 |
| EP | 1300262 | 4/2003 |
| FR | 2387802 | 11/1978 |
| FR | 2586378 | 2/1987 |
| FR | 2750913 | 1/1998 |
| FR | 2767285 | 2/1999 |
| FR | 2792251 | 10/2000 |
| FR | 2794063 | 12/2000 |
| FR | 1015285 | 11/2001 |

* cited by examiner

WHEEL WITH TENSION SPOKES AND A METHOD OF MANUFACTURING SUCH WHEEL

CROSS-REFERENCE TO RELATED APPLICATION

This application claims priority under 35 U.S.C. §119 of French Patent Application No. 05.09501, filed on Sep. 16, 2005, and French Patent Application No. 05.13086, filed on Dec. 21, 2005, the disclosures of which applications are hereby incorporated by reference thereto in their entireties.

BACKGROUND OF THE INVENTION

1. Field of the Invention

The invention relates to a bicycle wheel having tension spokes and to a method for manufacturing such a wheel. More particularly, in a non-limiting embodiment, the rim and spokes of the wheel are made from a composite material.

2. Description of Background and Relevant Information

As is known, a wheel with tension spokes includes a peripheral rim having a channel for receiving a tire, typically a pneumatic tire, as well as a central hub and spokes extending between the rim and the hub.

Spokes are usually distributed in two sets, the spokes of each set connecting the rim to respective ones of the transverse ends of the hub. The spokes are tensioned so that the various components of the wheel, i.e., the rim, the hub and the spokes, form a rigid assembly.

Important properties of a wheel include its weight, rigidity, and fatigue strength.

The weight essentially depends upon the materials used. As a general rule, the rim is made of an aluminum alloy or other lightweight material, and the spokes are made of stainless steel or an aluminum alloy.

Wheels are also known in which the rim and/or spokes are made of a composite material. Indeed, a composite material has certain advantages over commonly used metals. In particular, a composite material has a high modulus of elasticity, 125,000 MPa (Megapascals) compared to 72,000 MPa for an aluminum alloy 7075, and a low density, 1.55 kg/m$^3$ compared to 2.8 kg/m$^3$ for the aluminum alloy 7075, and 7.8 kg/m$^3$ for stainless steel.

Furthermore, a composite material has a fatigue strength that is markedly greater than that of metals. When the wheel is rotationally driven, the spokes are subject to repeated tensile and release stress cycles; the rim is also locally subject to compressive and tensile stress cycles. For a spoke made of metal, these stresses can, over time, cause cracks leading to ruptures. A spoke made of a composite material has a much more stable behavior with respect to fatigue strength.

The rigidity of a wheel is evaluated by its resistance to deformation. Usually, one distinguishes the front rigidity, i.e., the resistance to deformation in reaction to an impact or a frontal force, and the lateral rigidity subsequent to an impact or a lateral force. One seeks particularly to stiffen the wheel laterally.

The rigidity of a wheel mainly depends upon the spoke tension that exists between the rim and the hub. The spoke tension must be sufficiently high to prevent any spoke from becoming loose during normal operation of the wheel. If a spoke were to loosen momentarily due to an external load, it would be as if the spoke did not exist. The rim is no longer supported by the loose spoke and the rim becomes deformed under the effect of the forces to which it is subjected due to the load and to the tension exerted by the other spokes. Thus, the more tensioned the spokes, the farther the threshold beyond which the tension of a spoke is cancelled by the action of an external load, and the more rigid the wheel.

The tension of a spoke must however be considered from a relative standpoint. By definition, the rim is in static balance with respect to the hub under the effect of the tension of all of the spokes. Under these static conditions, the tension of a spoke is reactively taken up by the other spokes depending upon their position in relation to the spoke considered. Dynamically, a variation in the tension of a spoke is carried over to the other spokes in the form of an increase or a decrease in their own tension.

The most common manner of tensioning spokes involves associating each of the spokes with a screw/nipple system with which the effective length of the spoke can be adjusted.

Such a tensioning device is advantageous because it makes it possible to adjust the overall tension in the sets of spokes and to locally adjust the geometry of the rim, i.e., to true the rim, by local action on the tension of one or several given spokes. Geometrically, the parameters of a rim that can be adjusted include lateral runout (deformation of the rim along an axial direction), centering (relative position of the axis of revolution of the rim and the axis of rotation of the hub), or radial runout (deformation of the rim along a radial direction).

The overall tension of the spokes is adjusted by more or less tensioning all of the spokes, taking into account their mechanical properties. This determines the rigidity of the wheel. A flaw in the geometry of the wheel can furthermore be corrected by locally adjusting the tension of one or several spokes by means, for example, of a screw/nipple system integrated in the area of the fastening ends of the spoke. Adjusting the geometry of a rim can be a time-consuming and expensive process, as it requires each spoke to be individually adjusted.

Such an adjusting device is known for metallic spokes, but also for spokes made of a composite material. In this regard, the following patent documents can be cited: FR 2 586 378; U.S. Pat. No. 6,036,281; EP 872 357; EP 1 044 827; and FR 2 792 251. The device for tensioning the spokes can be found at the connection between the spoke and the rim, between the spoke and the hub, or along the spoke itself.

Such a device yields good results when associated with each spoke. However, this significantly increases the weight and inertia of the wheel. Moreover, the screw/nipple connection of the tensioning device creates weakened zones where the transmission of forces and the fatigue strength are not controlled as well as in the body of the spoke itself. In the case of composite spokes, the use of a screw/nipple adjusting device, which is necessarily metallic and, therefore, sensitive to the phenomena of fatigue rupture, diminishes the fatigue strength of the spoke/adjusting device assembly and, therefore, limits the advantage of using a composite spoke. These screw/nipple adjusting devices also constitute a weight increase, also reducing the advantage of using composite spokes.

Another method for tensioning the spokes involves spacing the spoke sets apart in the area of the hub. U.S. Pat. No. 5,104,199 discloses a spacing system in the area of the hub, with split washers that are housed in grooves of the hub body for maintaining the spacing between the two spoke sets. By spacing the spoke sets apart in the area of the hub, all of the spokes in the two sets are tensioned simultaneously. The spokes themselves do not have their own tensioning mechanisms. Such methods are used in connection with composite wheels. These methods are efficient because the resulting wheel is essentially a monolithic structure, and no unnecessary adjusting metal element increases the mass of the wheel or weakens the wheel. As a result, the wheel is lighter in weight and has less inertia. However, once the spokes are tensioned, the geometry of the rim cannot be modified. Under these conditions, this geometry is dependent upon the precision with which the manufacture and assembly of the various elements were carried out. The fact that the wheel does not include any final adjusting mechanism may result in wasting a substantial quantity of material and in considerably increasing the production cost. Moreover, the monolithic structure of the wheel does not allow repairs, since the wheel, along with the hub, must be entirely replaced in the case of a problem.

In view of this prior art, there is a need for a wheel with tension spokes, and for a wheel having an improved system for tensioning spokes, as well as a method for manufacturing same, which is simplified while remaining efficient with respect to the mechanical properties and geometric parameters of the rim. There is also a need for a wheel whose useful life is increased, and whose sensitivity to the phenomena of fatigue rupture is reduced. There is also the need for having the capability of making adjustable and lightweight spoke wheels made from a composite material.

Finally, there is the need to increase the speed of adjusting the geometric characteristics of a wheel.

SUMMARY OF THE INVENTION

A wheel according to the invention includes a central hub, a peripheral rim and spokes extending between the rim and the hub. The hub has two ends, the rim and each of the ends of the hub having a device for fastening the spokes. The spokes have a body and ends through which they are fastened to the rim on one side, and to the hub on the other side, and they are distributed in at least two sets, each set connecting the rim to a respective end of the hub.

The spokes are distributed in two groups, a first group of spokes having no tensioning device, and a second group of spokes having a tensioning device between their two fastening ends.

A method for manufacturing a wheel according to the invention, with the wheel including a peripheral rim, a central hub and connecting spokes tensioned between the rim and the hub, includes the following:
  distributing the spokes in two groups, a first group of spokes lacking a tensioning device, and a second group of spokes having a tensioning device;
  assembling the spokes to the rim and to the hub;
  adjusting the tension of the spokes by means of the device for tensioning the spokes of the second group.

Such a manufacturing method makes it possible to cut the adjustment time at least in half, since the spokes of only one group and, for example, one spoke out of two, need adjusting.

BRIEF DESCRIPTION OF THE DRAWINGS

For the purpose of providing a further understanding, the invention will be described below with reference to the annexed drawings, in which.

DETAILED DESCRIPTION OF THE INVENTION

Figure 1:
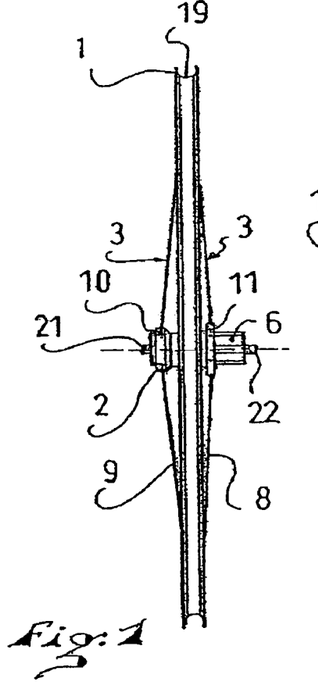
FIG. 1 shows a front view of a wheel.

FIG. 1 shows a wheel having a peripheral rim 1, a central hub 2 and spokes 3 extending between the rim and the hub 2. The rim 1 is of a known type and has any appropriate symmetrical or non-symmetrical cross-sectional profile. However, a particular cross-sectional profile is described below in connection with FIGS. 5 and 7. Conventionally, the exterior of the rim has a channel 19 for receiving a tubular or a pneumatic tire. The interior of the rim is provided with spoke fastening devices that are of any appropriate type, and two particular embodiments of which are described below in connection with FIGS. 5, 7 and FIGS. 8 to 11.

The hub 2 can be of any appropriate type. According to the embodiment shown, the wheel is a rear wheel and the hub 2 has, on one side, a free wheel body 6 that is provided to receive transmission gear wheels. It has ends 21, 22 for attachment to the bicycle frame.

The fact that the wheel is a rear wheel is not limiting; the invention also applies to a wheel whose hub is provided to receive a braking disk, or even a wheel having a symmetrical hub.

The hub 2 is equipped with a spoke connecting device located in the area of each of its axial ends 10, 11. Any appropriate device is suitable, such as, for example, a flange, a disk, a crenellated structure, or other devices. The connecting device is adapted to the particular type of spokes 3 being used, such as being dependent upon whether the spokes 3 are straight or have an elbow, and their relative arrangement depends upon whether they are straight or elbowed. For the purpose of this disclosure, the expression "spoke-connecting regions" of the hub is directed to those areas on the hub which are laterally spaced-apart and are generally located in the aforementioned areas of the ends 10, 11 of the hub.

According to the embodiment shown, the spokes 3 are straight spokes, and they are distributed in two spoke sets 8 and 9. Each set connects the rim 1 to one of the axial ends 10 and 11 of the hub. In this embodiment, as shown in FIG. 1, the spokes 8 extend in a direction from the rim to the hub and outwardly in a first axial direction (i.e. toward the free wheel), whereas the spokes 9 extend from the rim to the hub and outwardly in an opposite axial direction (i.e., away from the free wheel). Each spoke of the sets 8 or 9 has, at the hub 2, one fastening end that is conventionally formed by an enlarged head 8a, 9a. The ends 8c, 9c, 9d of the spokes on the side of the rim are described below.

For the wheel shown, the spoke set 8 that is located on the side of the free wheel 6 is comprised of radial spokes, that is, spokes that are radially oriented in relation to the axis of the hub 2 and do not cross other spokes of their set, and the spoke set 9 located on the side opposite the free wheel 6 is comprised of spokes that are tangent to the hub, or generally tangent, and mutually cross one another. However, this is not limiting, and other arrangements of spokes can also be employed. In particular, the two sets can be made of crossed spokes, or the spokes can be radial on the side opposite the free wheel and crossed on the side of the free wheel.

For the wheel shown, which has straight spokes (see FIG. 4), the axial hub end 10 located on the side opposite the free wheel 6 is provided with teeth 10a. Two grooves 10b of the hub end 10 extend within each tooth 10a, the grooves extending along a plane substantially perpendicular to the axis of the hub 2 and open outwardly/exteriorly, and two spokes 9 are engaged head-to-foot in the grooves 10b by their enlarged head 9a. Such a method for constructing the teeth is known and described, for example, in the patent document FR 2 794 063.

Figure 4:
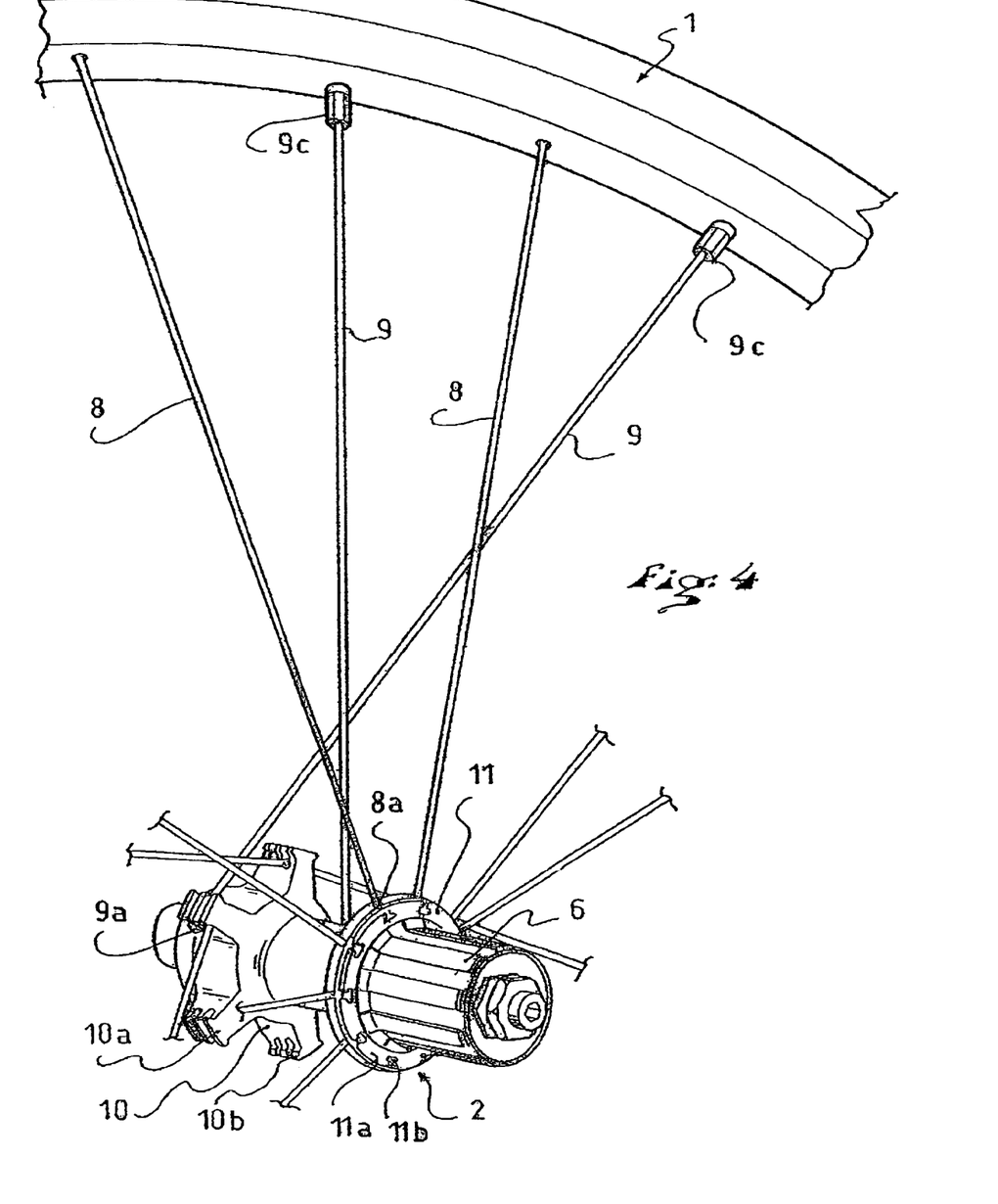
FIG. 4 shows a partial perspective view of the wheel of FIG. 1.

The axial end 11 of the hub located on the side of the free wheel 6 is formed by a flange 11a, shown to be somewhat concave, having axial notches 11b in which the spoke ends 8 engage, such that the enlarged spoke heads 8a are retained within the flange. Possibly, the flange can be closed by any appropriate means, such as a cupel, for example; and it is possible to provide an intermediate washer to ensure the retention of the spoke heads 8a inside the flange 11a. Other modes of fastening the spokes can also be used.

According to a particular feature of the invention, the spokes 3 are distributed in two groups. The first group is formed with spokes that do not have their own tensioning devices. That is, the spokes of this first group have a continuous filiform/wire-like body between their fastening ends. The distance between the two fastening ends of each spoke is predetermined, and it can vary only under the effect of the tension that is induced between the ends of the spoke, due to the specific elasticity of the spoke body.

The second group of spokes includes spokes that have a tensioning device located in the area of at least one fastening end. This device makes it possible to generate and adjust tension in the body of the spoke. For example, this can be a screw/nipple device located in the area of one end of the spoke or along the length of the body. This device tends to move the two spoke fastening ends closer to (or away from) one another. The hub, the rim, and the other spokes oppose this bringing together, which generates tension in the spoke body and, by reaction, which generates forces on the remainder of the wheel.

Thus, by distributing all of the spokes in two different groups, the tensioning devices of the second spoke group create tension in the spokes of the second group and, by reaction, generate tension in the spokes of the first group.

Furthermore, the duration of the operations of adjusting the wheel is reduced since only the spokes provided with a tensioning device need to be adjusted.

Generally, there are fewer spoke tensioning devices. The wheel is therefore lighter in weight and a greater tractive/tension force can be applied to the spokes lacking a tensioning device because they have a greater fatigue strength and a greater resistance to deformation.

Figure 2:
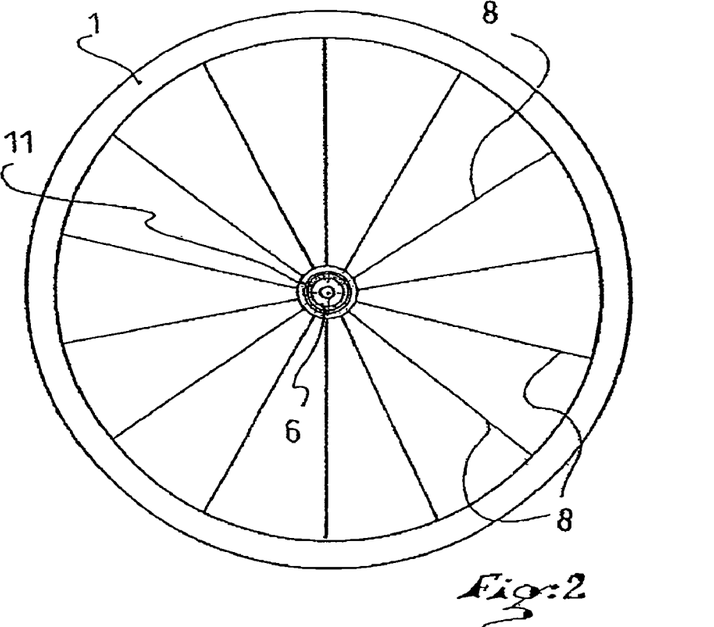
FIGS. 2 and 3 show right and left views, respectively, of the wheel of FIG. 1.
Figure 3:
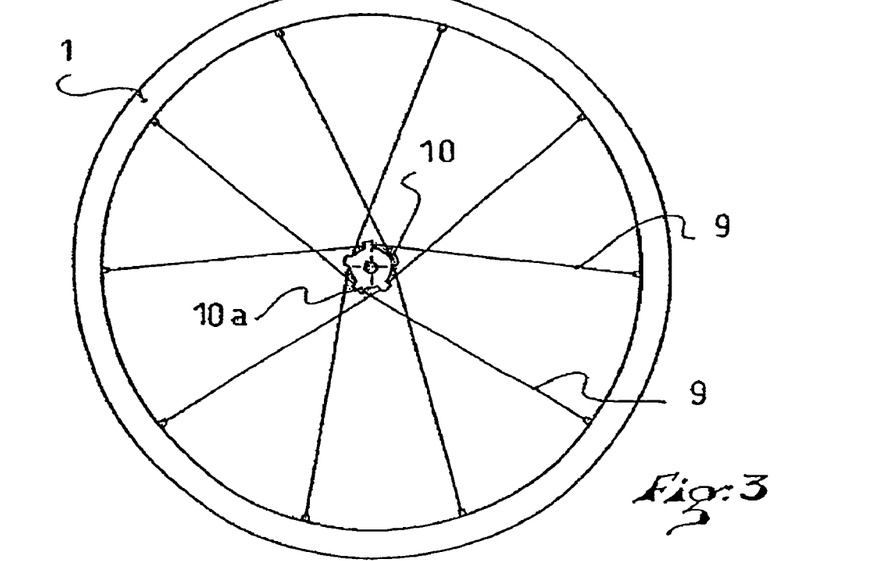

For the embodiment shown, the distribution of the spokes in two groups is associated with the sets, that is, the spokes 8 of the set located on the side of the free wheel 6 form the first group of spokes lacking a tensioning device, and the spokes 9 of the set located on the side opposite the free wheel 6 form the spokes of the second group. This is not limiting, however, and other modes for distributing the spokes can be employed, such as is described below. With this distribution, and with each of the two sets of spokes being equal in number to the other set, only half of the spokes are provided with adjustment devices, and the adjustment time is therefore cut in half. As an example, in such an embodiment, i.e., whereby each of the two sets of spokes being equal in number, the number and pattern of spokes of the spoke set on the free wheel side could be duplicated for the spokes of the spoke set opposite the free wheel side, in which case, FIG. 2 would depict both spoke sets 8 and 9. Likewise, the number and pattern of both spoke sets could be embodied as that illustrated in FIG. 3. If the number of spokes differs between the two sets, such as fourteen spokes in the spoke set 8 and ten spokes in the spoke set 9, as shown in FIGS. 2 and 3, respectively, i.e., whereby at least approximately half of the spokes are provided with adjustment device, the adjustment time is reduced proportionally.

Figure 5:
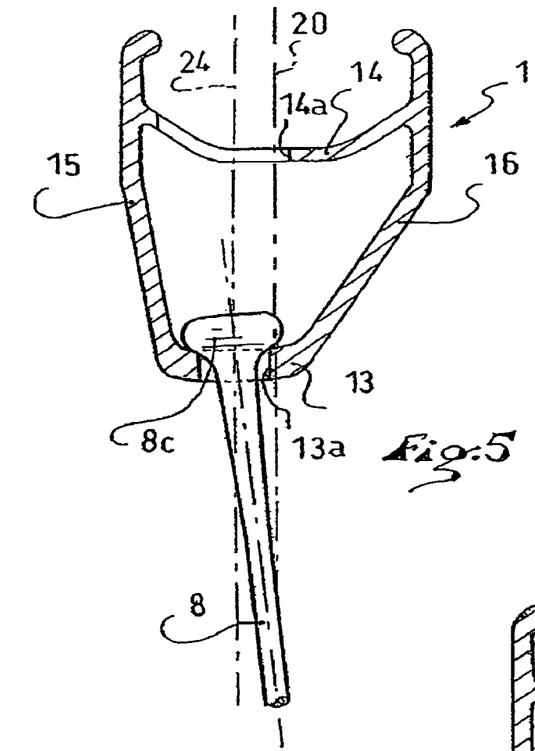
FIGS. 5 and 7 are transverse cross-sectional views in the area of the rim and show the various expedients for fastening the spokes for the wheel of FIG. 1.
Figure 7:
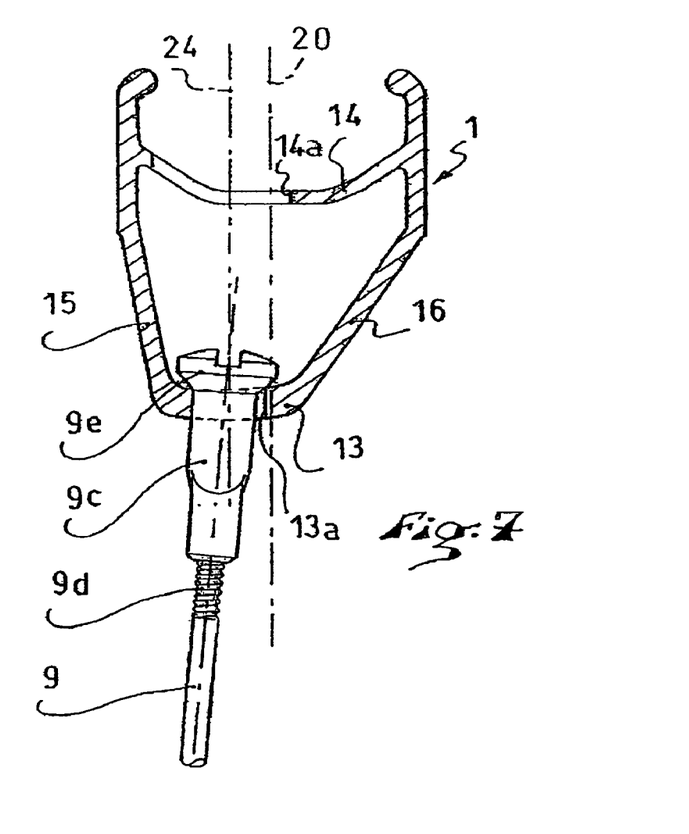

FIGS. 5 and 7 show that each of the spokes 8 is fastened directly to the rim through an enlarged head 8c that forms the fastening end. The body of the spoke 8 is filiform/wire-shaped and continuous between the fastening ends 8a and 8c.

The spokes 9 are fastened to the rim by means of a spoke nipple 9c having an enlarged head 9e, which is screwed onto the threaded end 9d of the body of spoke 9. The enlarged head 9e of the nipple 9c is the fastening end of the spoke 9 in the area of the rim. Between the fastening ends 9a and 9e, the nipple 9c forms, together with the threaded end 9d, an adjustment device for tensioning the spoke.

For the illustrated embodiment, the rim 1 has a box structure, with a lower bridge 13, an upper bridge 14 and two lateral walls 15 and 16 connecting the two bridges. The two bridges 13, 14 are bored with openings, the lower bridge 13 with openings 13a for retaining the spoke fastening heads, and the upper bridge 14 with openings 14a having a larger diameter for the insertion of the spokes 8, 9 or of the spoke nipples 9c inside the box. The openings 13a, 14a are uniformly distributed at the periphery of the two bridges, and the number of spokes is equal on the two sets of the wheel. For the purpose of this disclosure, the areas of the rim, such as in the areas of the openings 13a which retain the spoke fastening heads, are referred to as "spoke-connecting regions" of the rim.

This mode of construction is not limiting. It is also possible to group the openings 13a, 14a by pairs, or by groups of three openings or more in order to associate the spokes by groups of two spokes or more. The two sets can also have different numbers of spokes, especially in the case of a rear wheel; one can also have a greater number of spokes on the side of the free wheel in order to balance the tension inside the spokes of the two sets, as disclosed in the patent document FR 2 387 802.

Any appropriate arrangement, such as single or double eyelets, or intermediate washers, can be provided to ensure that the ends of the spokes seat properly against the lower bridge of the rim.

Figure 6:
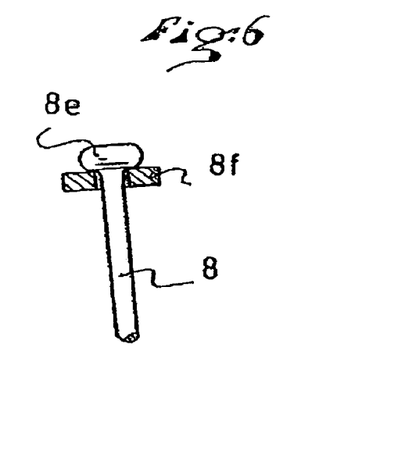
FIG. 6 shows an alternative method for constructing the device of FIG. 5.

As has been described previously, the spokes 8 of the first group have retaining heads 8a, 8c at their ends. Under these conditions, the heads 8a, 8c must have different dimensions, and the head 8c must have larger dimensions than those of the head 8a in order to enable the positioning of the spoke in the rim. According to an alternative embodiment shown in FIG. 6, the head 8e substantially has the same dimensions as the other head of the spoke, and an intermediate washer 8f is inserted on the spoke body, at the time the head 8c is shaped. This washer enlarges the seat of the head 8e In the area of the lower bridge 13 of the rim; it supports the spoke head in the area of the lower bridge of the rim. The spoke 8 can thus be made with heads 8a, 8c having the same dimensions. This arrangement also facilitates the manufacture of the rim, as it is then possible to bore the retaining openings 13a in the same fashion for the spokes 8 and 9.

The arrangement for fastening the spokes to the rim is not limiting; other arrangements can be used depending upon the structure of the spokes and of the rim. In particular, buttonhole-shaped holes could be provided in the rim, as disclosed, for example, in U.S. Pat. No. 2,937,905 in connection with FIGS. 1 to 5.

For the embodiment shown in FIGS. 1 to 7, all of the spokes 8 of the first group have an identical length between the fastening ends 8a, 8c. This length is predetermined with as low a tolerance as possible depending upon the final state of the wheel, with the spokes being tensioned.

The spokes can be made of any appropriate material, including the materials stainless steel, aluminum alloy, or the like. Other materials can also be used, such as composite materials. The spokes can also be formed from a succession of segments made of various materials.

The wheel is assembled as follows: the spokes of the first group, namely the spokes 8, are fastened to the rim and to the hub. Next, the spokes 9 having a tensioning device 9c, 9d are assembled. The assembly of the spokes 8 and 9 can be carried out differently, however. The spokes 9 are then tensioned overall, i.e., generally, to establish a general level of force between the rim and the hub. This general level determines the rigidity of the wheel. Finally, the tension of the spokes 9 is locally adjusted in order to adjust the geometry of the rim, especially the lateral runout, the centering, and the radial runout. Due to the dish angle formed by the sets of spokes 8, 9 in the area of the hub, the tensioning of the spokes 9 generates, on the hub 2 and rim 1, axial and radial components that are taken up by the spokes 8 of the other set.

Under these conditions, the tension in the spokes 8 is dependent upon the axial and radial components to which the spokes are subjected, and upon their specific rigidity, that is, their resistance to deformation, i.e., their yield strength. Correlatively, the tension in the spokes 9 is dependent upon the adjustment of their specific tensioning device 9c, 9d and upon the resistance to deformation of the spokes 8.

To optimize the tension of the spokes 8 and 9, one can proceed as described below.

From a mechanical standpoint, the rim is in static balance in relation to the hub 2 along axial and radial directions under the effect of the cumulative tension of the spokes 8 and 9 of the two sets. Geometrically, when the spokes 8, 9 are tensioned, the rim is located in the radial median plane of the hub, meaning that the radial median plane of the pneumatic tire-receiving channel (medial plane of the rim), the outline of which is shown by means of the broken line 20 in FIGS. 5 and 7, coincides with the middle of the hub 2, this middle being defined, not between its ends 10 and 11 for fastening the spokes, but between its ends 21 and 22 for attachment to the bicycle frame (see FIG. 1).

With the mode of assembly described above, the tensioning of the spokes 9 draws the rim toward the end 11 of the hub in order to bring the rim in coincidence with the middle of the hub.

Due to the presence of the free wheel 6, the spokes 8 located on the side of the free wheel are closer to the middle of the hub than the spokes 9. As a result, they must be further tensioned than the spokes 9 to ensure the axial balance of the rim. Additionally, still due to the free wheel, only a small amount of backward movement is available for displacing the rim axially and for tensioning the spokes 8 from the moment when the spokes 8 are loose and only assembled to the rim and to the hub, up to the moment when the rim is in coincidence with the middle of the hub and the spokes are tensioned.

During assembly, the most favorable situation for finally obtaining a high tension in the spokes 8 is that the median plane 20 of the rim coincides with the fastening end 11 of the hub for the spokes 8. To be able to fasten the spokes 8 to the rim or to the hub, it is indeed necessary to have a minimum clearance in the spokes 8 while they are all in the non-tensioned state.

For a usual hub 130 millimeters long, the distance between this fastening end 11 of the hub and the middle of the hub is about 17 millimeters, taking into account the space requirement of the free wheel.

To increase backward movement of the rim that is available for tensioning the spokes, the radial median plane for receiving the pneumatic tire is axially offset in relation to the radial median plane for fastening the spokes in the area of the fastening end 10 of the hub, the outline of which is schematically designated by the reference numeral 24 in FIGS. 5 and 7.

One solution involves using an asymmetrical rim profile, such as that shown in these drawing figures, with an offset of the radial median plane 20 for receiving the pneumatic tire in relation to the radial median plane 24 for fastening the spokes, this offset being oriented toward the spokes 8 that do not have a tensioning device.

Due to this offset, the spokes 9 must be further tensioned in order to bring the rim, or more precisely the pneumatic tire-receiving channel, in coincidence with the middle of the hub. A higher tension of the spokes 9 reactively generates a higher tension in the spokes 8. A higher tension can thus be achieved in the two spoke sets. It has been noted, on a wheel having the spoking arrangement described, that a 3-millimeter offset between the two planes enables a spoke tension increase of 43% on the side of the free wheel and of 70% on the side opposite the free wheel. Overall, due to this offset, the rigidity of the wheel is significantly increased. The wheel can withstand more substantial forces or external loads before a spoke loosens and causes a momentary weakening in the rigidity of the rim.

Another solution for offsetting the fastening plane of the spokes 9 involves fastening these spokes to the lateral wall of the rim that is opposite the fastening end of the hub. The patent documents EP 1 300 262 and FR 2 792 251 disclose such a mode of construction.

The mode of constructing the wheel that has just been described is not limiting. The spokes of the two sets can also be crossed, or the spokes of the set located on the side opposite the free wheel can be radial and the other spokes can be crossed. Also, the tensioning device can be positioned in the area of the hub or along the spokes 9. In the various cases, however, one will prefer the spoke group distribution that has been described, namely the first group of spokes lacking a tensioning device, formed by the spokes located on the side of the free wheel, and the second group of spokes having a tensioning device, formed by the spokes located on the side opposite the free wheel.

For a wheel such as that shown in FIG. 1, which has radial-spokes on the side of the free wheel, the fact that these spokes located on the side of the free wheel lack a tensioning device is advantageous because these spokes withstand a higher tension than the spokes of the other set, due to the difference in the inclination of the sets. Moreover, the mounting of the wheel is facilitated because it is easier and faster to adjust the tension of the spokes 9 located on the side opposite the free wheel and to adjust the geometric parameters of the rim by playing with the tensioning devices of the crossed spokes of the set located on the side opposite the free wheel, since these spokes are less tensioned than those of the opposite set, are more steeply inclined with respect to the median plane of the rim, and since they are furthermore inclined in their own spoke set due to their crossing. The amount of force required to be carried by the tensioning device 9c, 9d is also relatively lessened, and the tensioning adjustment is carried out more rapidly and with greater sensitivity.

For a wheel that would have crossed spokes 8 on the side of the free wheel 6, the fact that these spokes 8 lack a tensioning device is furthermore advantageous because these spokes transmit the largest portion of the transmission torque to the rim. As a result, they can withstand high dynamic loads.

Generally speaking, the spokes lacking a tensioning device can be more tensionally loaded and they can also have a greater fatigue strength, since they do not include the relatively more fragile metallic adjusting elements. This strength can be further optimized if the spokes are made of a composite material.

According to one embodiment, the spoke set on the side of the free wheel is made of a composite material and does not include adjusting devices, and the spoke set on the side opposite the free wheel is radial and therefore lacks torsional rigidity, such that the transmission forces are applied entirely on the side of the free wheel, which is practically stronger as it does not have weakening (non-composite) adjusting devices.

Other modes of distribution are also suitable. For example, for crossed spokes, one usually distinguishes between "pulling" spokes that transmit a dynamic tension force to the rim and "pushing" spokes that transmit a dynamic pushing force. Under these conditions, the first group of spokes can be formed by "pulling" spokes whose dynamic tension is added to the static tension, and the second group can be formed by "pushing" spokes whose dynamic tension is subtracted from the static tension. For such a mode of construction, it is preferred that the hub have a relative torsional flexibility.

Generally speaking, the spokes lacking a tensioning device, which constitute the spokes of the first group, are those spokes that are capable of withstanding the highest tension stresses, and the spokes of the second group constitute the other spokes.

Other distribution arrangements are also suitable.

Due to the presence of tensioning devices for only part of the spokes, the wheel is lighter in weight and can be more easily and quickly mounted. Moreover, by judiciously distributing the spokes, it is possible to raise tension in all of the spokes and, therefore, to make the wheel more rigid.

It is to be understood that the above description also applies to a wheel equipped with a brake disk. The problem is essentially the same. Due to the presence of the disk, the spokes of the two sets have different inclinations in relation to the radial median plane of the rim. One of the sets is therefore closer to the middle of the hub. The difference is that, dynamically, the spokes transmit a braking torque, not a driving torque, to the rim.

The invention also applies to a front wheel in which the spokes of the two sets have the same inclination.

FIGS. 8 to 11 show an alternative embodiment of the invention. The rim is made here as disclosed in the patent document FR 2 750 913 and in U.S. Pat. No. 6,224,165, in connection with the embodiment of FIG. 13, and the spokes are made as disclosed in patent document FR 2 767 285 and in U.S. Pat. No. 6,189,978.

The lower bridge 13' of the rim is thus bored using a so-called flow drilling technique that produces tunneled openings 13a oriented inward of the box structure. These openings 13a are threaded so that the hollow screws 38d, retaining the heads 38c of the spokes, can be screwed into place.

The body of the spoke 38 is made of aluminum alloy or another metal; each of its ends has an enlarged head 38a or 38c. At the spoke end located on the side of the rim, a hollow screw 38d is inserted onto the body of the spoke 38 to serve as a seat for the enlarged head 38c; this screw is provided to be screwed within a tunneled opening 13a of the rim.

FIGS. 8 to 11 show two types of spokes, viz., spokes 38 that lack a tensioning device and spokes 39 that have a tensioning device.

Figure 8:
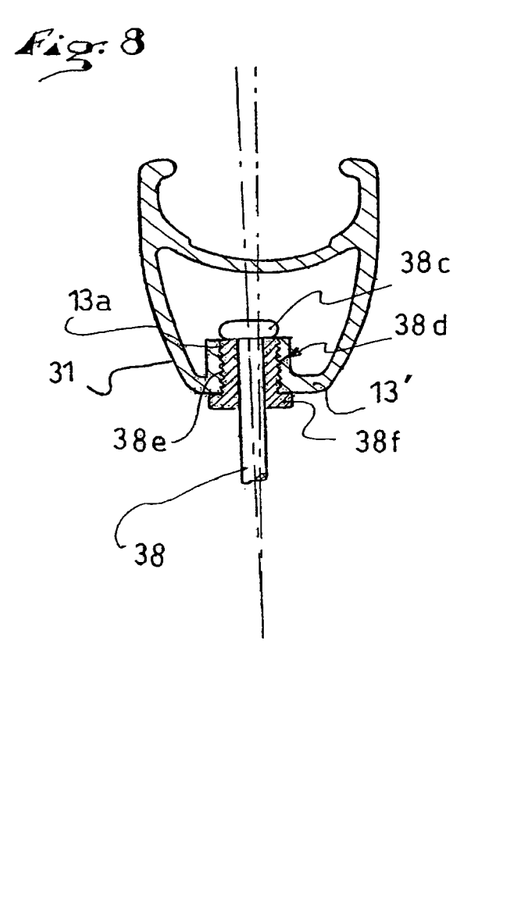
FIGS. 8 to 11 show a rim in cross-section and rims made according to an alternative embodiment of the invention.
Figure 9:
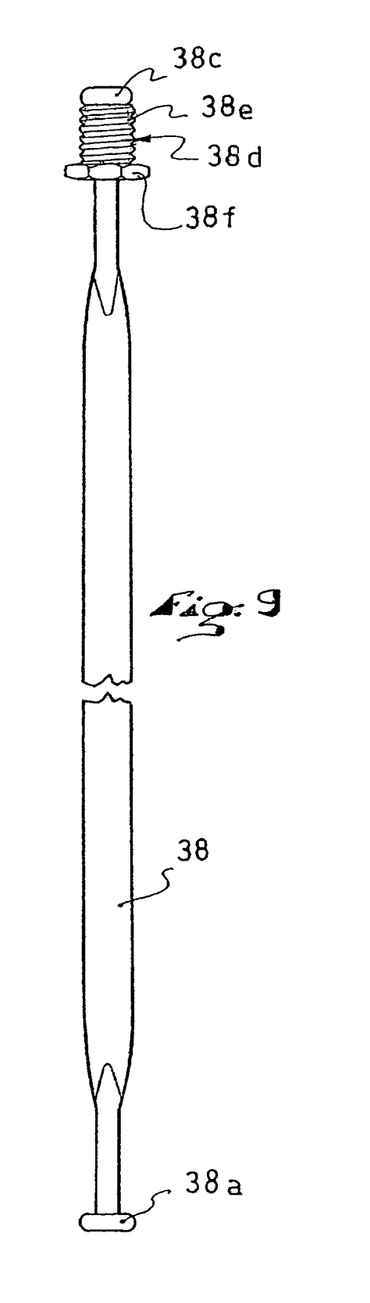

The spokes 38 have a first fastening end, with a head 38a, for fastening to the hub and a hollow screw 38d that is located beneath the other head 38c for fastening to the rim 31. The hollow screw has a threaded zone 38e that is provided to be screwed within a tunneled opening 13a of the rim, and a shouldered collar 38f that is provided to be supported against the lower bridge 13' of the rim when the hollow screw 38d is forcibly tightened. The shouldered collar has a hexagonal cross-section, for example, to enable connection to an appropriate wrench or other tightening tool. FIG. 8 shows the hollow screw 38d when tightened.

The shouldered hollow screw 38d, once forcibly tightened. Immobilizes the enlarged head 38c of the spoke in the area of the rim. Although there is a screw/nipple system, this is not a device for tensioning the spoke in the context of the invention; the function of the shouldered screw is only to fasten the end of the spoke to the rim, rather than to adjust tension.

Figure 10:
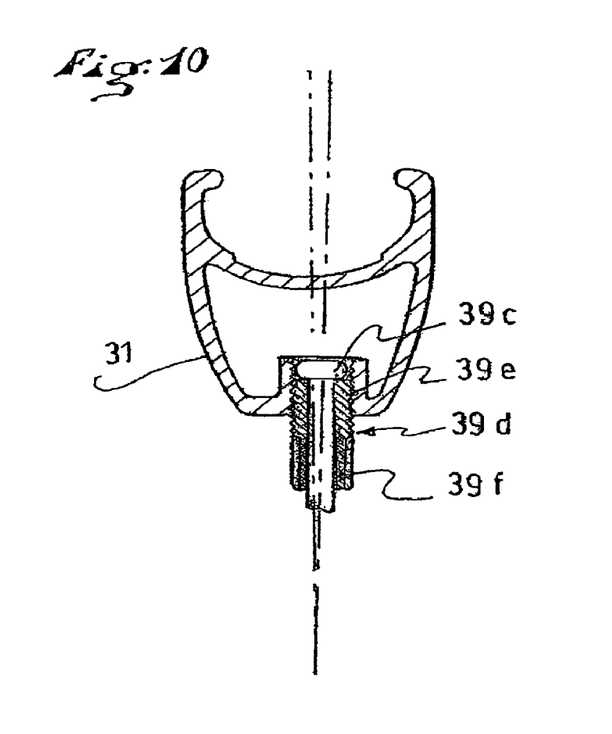
Figure 11:
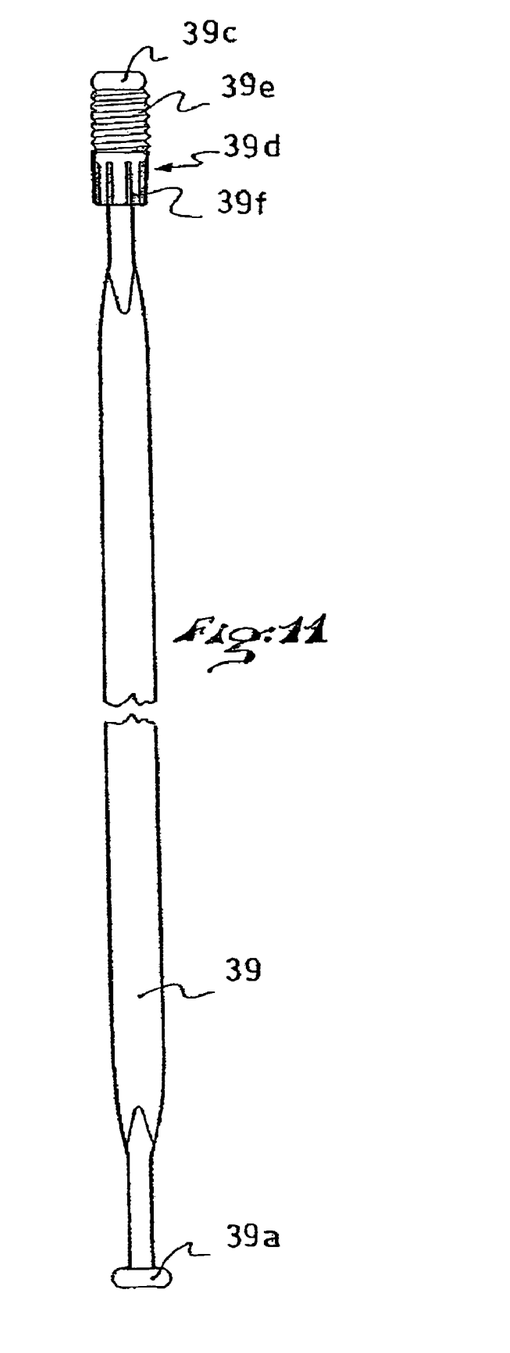

The spoke 39 shown in FIGS. 10, 11 has a similar structure, with an enlarged head 39a for fastening to the hub and a hollow screw 39d located beneath the other enlarged head 39c. In contrast with the first hollow screw 38d, the screw 39d has no shoulder and, therefore, can be screwed through a threaded zone 39e more or less deeply into the tunneled opening of the rim by means of an adjusting tool that is coupled to the hollow screw, for example, in a zone 39f. This hollow screw forms a screw/nipple system with the opening of the rim, and enables the spokes to be tensioned and the tension thus generated to be adjusted. Alternatives of this mode of construction are also possible within the context of the invention.

The assembly of the wheel is carried out according to the same operating method as previously described. Initially, the spokes 38 are assembled to the hub and to the rim where the shouldered hollow screws 38d are forcibly tightened. Next, the spokes 39 are assembled and tensioned by means of the hollow screws 39d; this reactively induces tension in the spokes 38. The spoke tension can then be locally adjusted by acting on the specific tensioning device of one or several spokes 39 in order to adjust the geometry of the rim.

Figure 12:
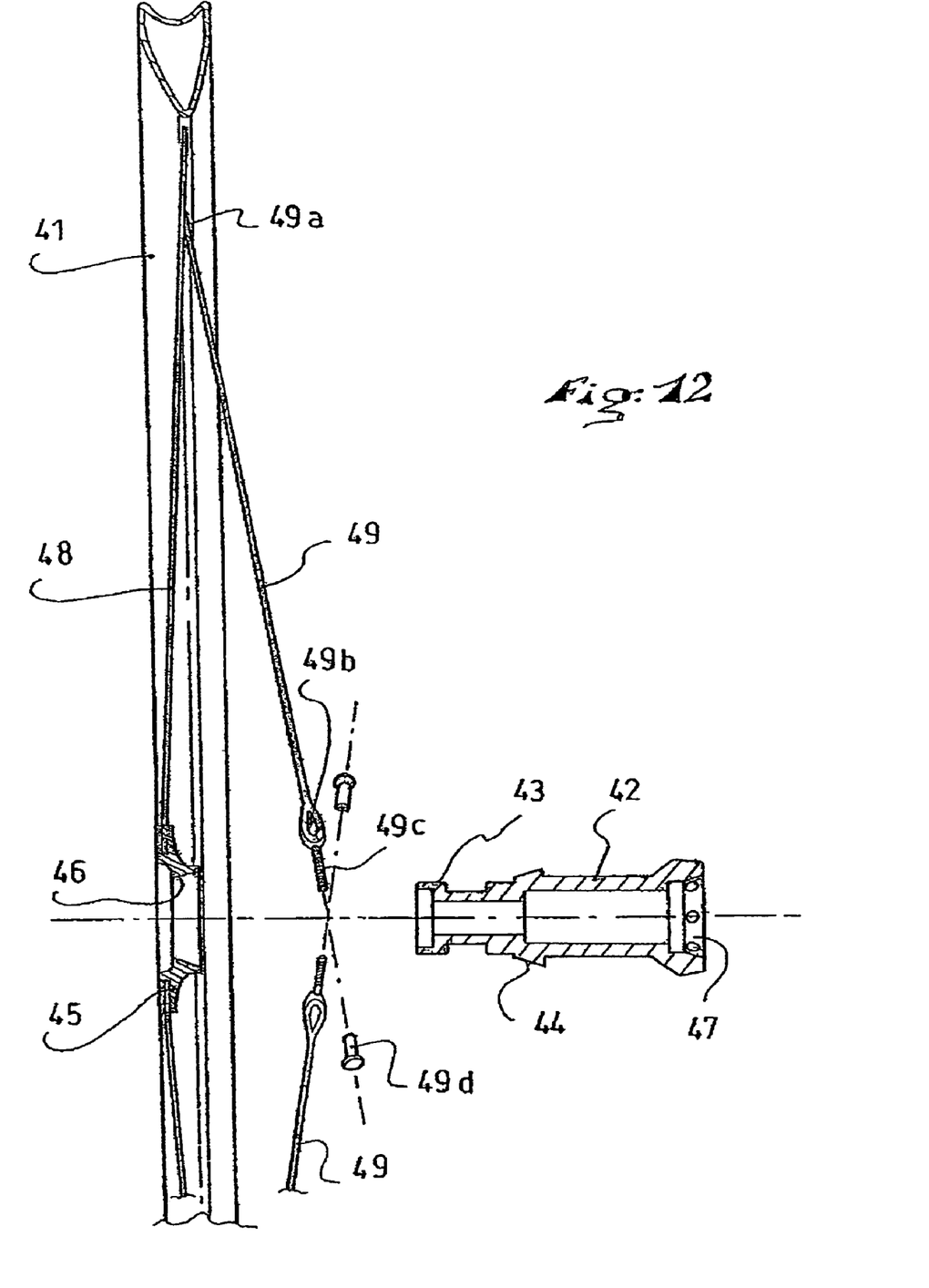
FIGS. 12 and 13 show the construction of a wheel according to another embodiment of the invention.
Figure 13:
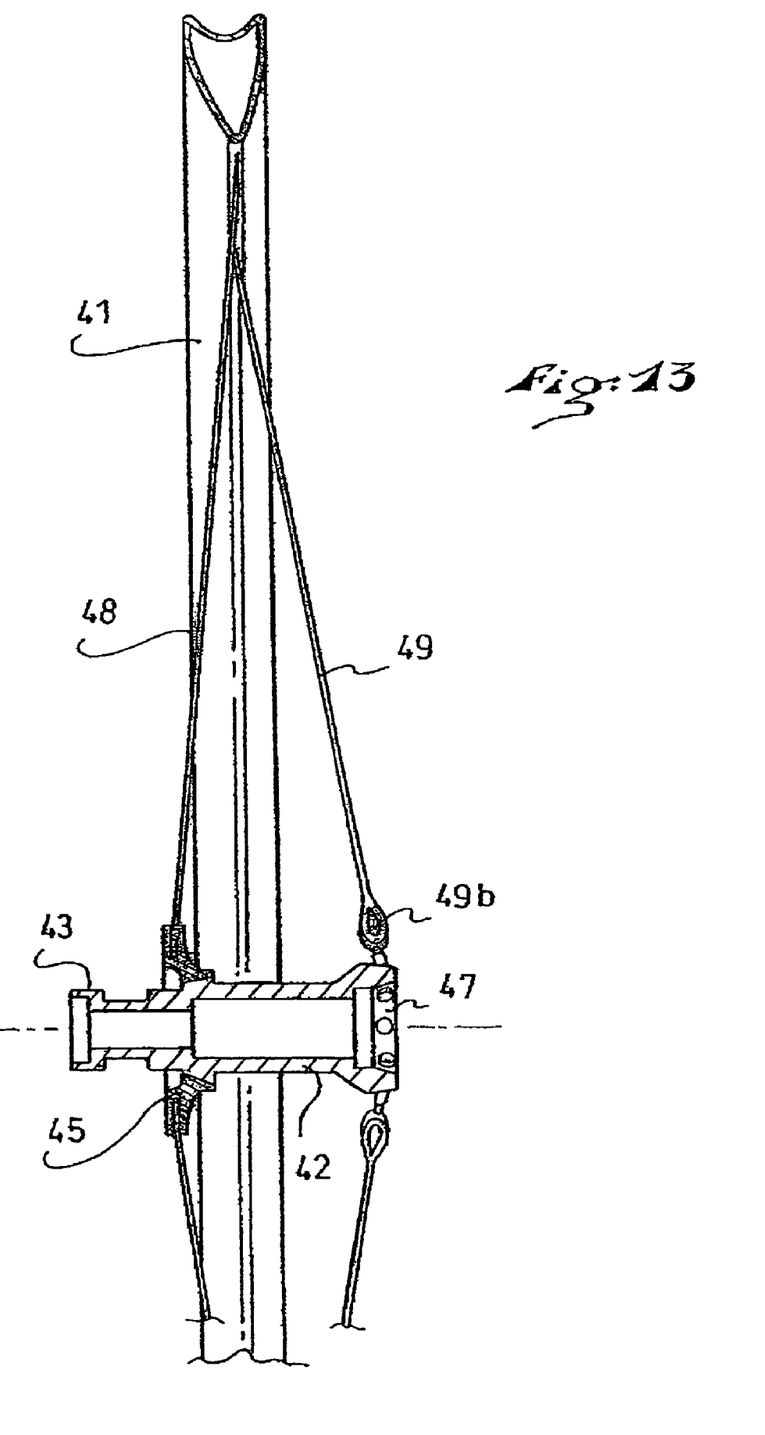

FIGS. 12 and 13 show the invention being applied to the construction of a wheel made of a composite material.

This wheel includes a rim 41 made of a composite material, in particular carbon fibers embedded in a resin matrix. Alternatively, other materials can be used within the scope of the invention. The rim is manufactured according to a known technique. For example, resin-coated carbon fibers are deposited around a foam core. According to another assembly technique, the fiber laps are deposited in a mold and pressed against the wall of the mold by the expansion of an inflatable bladder.

The wheel has a first set of spokes 48. These spokes are also made of a composite material, and they do not have a tensioning device. For example, the spokes are made from a plurality of resin-coated carbon fibers that are positioned in a shaping mold.

The spokes 48 are affixedly assembled to the rim. For example, they are assembled by means of glue or resin, and are copolymerized directly with the rim when the rim is molded.

In the center of the set, the spokes 48 are assembled to a flange 45 that will later be used for assembly to the hub. The flange 45 has a central opening 46. The spokes 48 are affixedly attached to the flange 45. It is possible to make the spokes by pairs, that is, to make an element having the length of two butt-Joined spokes. Each end of this element is provided to be affixedly assembled to the rim, and the element, in its center, is affixedly assembled to the flange 45 by means of glue or resin, for example. The flange is made of any appropriate material, such as an aluminum alloy or another metal, for example.

Other modes of construction are also suitable.

The spokes 49 of the other set are also made of a composite material, and they have a tensioning device between their fastening ends. For example, the spokes are made from a plurality of resin-coated carbon fibers. According to the illustrated embodiment, the ends 49a of the spokes 49 are affixedly assembled to the rim by means of glue or resin, for example.

Toward the center of the set, each spoke 49 is ended with an insert 49b that is extended by means of a threaded end-piece or tip 49c. This end-piece is provided to cooperate with a spoke nipple 49d that has an enlarged retaining head. For example, the end of the composite portion is formed in a loop, and the insert 49b is housed inside the loop at the time the spoke is manufactured or subsequent thereto.

The hub includes a hub body 42 having a generally tubular shape. The hub body 42 has, at one end, an end-piece that is provided to receive the free wheel body and free wheel mechanism, a fitting collar 44 that is provided to cooperate with the flange 45 and, at the other end, an open flange 47 bored with openings that are provided for the assembly of the spokes 49. To facilitate the centering of the hub body with respect to the spoke set, and to ensure a rotational coupling, the recess 46 of the flange 45 and the fitting collar 44 preferably have a truncated shape, and the contact surfaces are provided with a set of complementary grooves. Alternatively, other fitting and centering expedients can be provided within the scope of the invention, such as pyramidal contact surfaces, for example.

Once the hub body 42 is fitted with the flange 45, the nipples 49d are screwed onto the threaded end-pieces 49c from within the flange 45, through its openings. This results in tensioning the spokes 49 and, by reaction, in bringing the rim 41 in coincidence with the middle of the hub. If necessary, the geometry of the rim can be adjusted by varying the individual tension of the spokes 49.

As in the preceding case, the cross-sectional shape of the rim can be asymmetrical in order to achieve a higher tension in the spokes by means of a more substantial initial offset of the rim.

The wheel thus built is particularly lightweight and has a low rotational inertia. Moreover, the geometry of the rim can be adjusted at the time of assembly and the wheel can be easily dismantled later, which is not the case with monolithic or one-piece wheels made of a composite material. In addition, a geometric flaw/irregularity can be corrected later, if necessary, by means of the adjustment of the spokes 49.

The particular structure of the spokes that has been described is not limiting, and the invention also applies to spokes having a complex structure, that is, spokes that have a structure that is different from a rectilinear filiform/wire-shaped element. Advantageously, such spokes are made of a composite material, and the wheel is constructed according to the same mode of construction as the previous wheel; this is however not limiting, and other materials can also be used.

Figure 14:
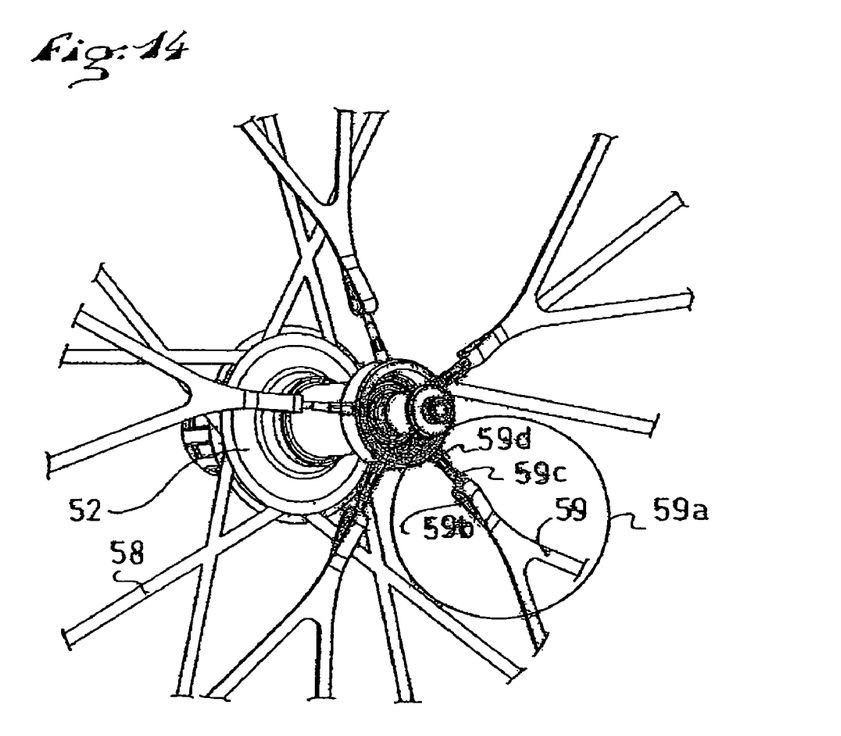
FIG. 14 shows another arrangement for constructing the spokes.

To illustrate this, FIG. 14 shows the central portion of a wheel, with its hub 52 and spokes 58 and 59.

The spokes 58 do not have a tensioning device, while the spokes 59 do have a tensioning device. According to the embodiment shown, the spokes 58 have an X-shaped structure, that is, these spokes are formed by two elongated arms that cross one another and are affixedly connected at their crossing point. The ends of the arms are connected on one side to the hub and on the other side to the rim by any appropriate means, such as with glue. The arms can be extended in the area of the hub by the arms of other spokes 58 of the set.

The spokes 59 are connected two-by-two by a Y-shaped structure 59a. The ends of the two upper arms are affixedly connected to the rim by gluing, for example, as previously explained. The lower arm has, at its end, the same fastening device as that described for the preceding embodiment, that is, an insert 59b extended by a threaded end-piece 59c on which a spoke nipple 59d is screwed. The head of the spoke nipple 59d is retained in the hub body. The threaded end-piece, together with the nipple, forms the tensioning device of the complex spoke 59.

Figure 15:
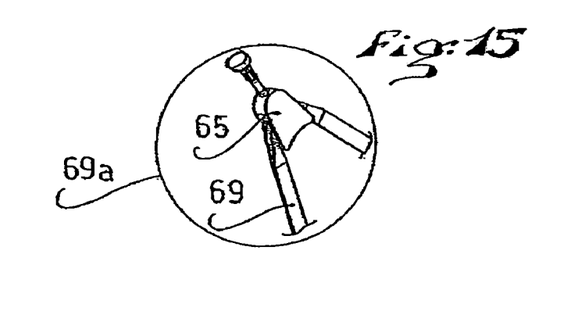
FIG. 15 shows an alternative arrangement for constructing the spokes of FIG. 14.

Instead of an insert 59b, a return 65 can be provided that is housed at the junction of the upper arms of the Y-structure 69a, as shown in FIG. 15 for the spokes 69. The advantage of the Y-construction is that an adjusting mechanism 59b, 59c in fact makes it possible to adjust the tension of two spokes 59 reunited by a Y-structure 59a. As a result, the adjustment duration is further reduced. The number of adjusting mechanisms capable of weakening the spoke can also be reduced.

The spokes 58 or 59 can be used with conventional wire-shaped spokes. Other complex spoke structures can be also be used. In particular, the spokes could be formed by a flexible and non-extensible filament tensioned between the rim and the hub and fastened to each of them with return elements.

Other modes for constructing the wheel can be adopted. For example, as is known, it is possible to construct the wheel in two portions, each portion including one half of the rim and one set of spokes assembled to this half of the rim, and then to assemble the two portions to one another. Other modes of construction are also possible.

The wheel that has just been described is a rear wheel; this is not limiting. The invention would apply in the same fashion to a wheel equipped with a disk brake or to a wheel, the two spoke sets of which have a symmetrical orientation.

The present description is only given by way of example, and other alternative embodiments could be adopted without leaving the scope of the invention.

In particular, the invention applies to wheels that have three sets of spokes, namely, two sets connecting the rim to each of the two ends of the hub and a third set connecting the rim to middle of the hub.

The invention claimed is:

1. A bicycle tensioned wheel comprising:
a central hub having a pair of laterally spaced-apart spoke-connecting regions, each of said regions of the hub having a device for connecting spokes;
a peripheral rim having spoke-connecting regions;
a plurality of spokes extending between the spoke-connecting regions of the rim and the hub;
each of the plurality of spokes having a pair of ends and an elongated body between the pair of ends;
a first end of each of the plurality of spokes being connected to a respective one of the spoke-connecting regions of the hub;
a second end of each of the plurality of spokes being connected to a respective one of the spoke-connecting regions of the rim;
the plurality of spokes comprising at least two sets, said two sets of spokes comprising:

a first set of spokes lacking any adjustable spoke-tensioning device, each of the spokes of the first set of spokes being made of non-metallic composite material;

a second set of spokes having an adjustable tensioning device between first and second ends of each of the spokes of the second set.

2. A wheel according to claim 1, wherein:

between the ends of the spokes, the spokes have a filiform body.

3. A wheel according to claim 1, wherein:

the first set of spokes lacking any adjustable spoke-tensioning device extends between the rim and a first of the pair of laterally spaced-apart spoke-connecting regions of the hub;

the second set of spokes having an adjustable tensioning device extend between the rim and a second of the pair of laterally spaced-apart spoke-connecting regions of the hub.

4. A wheel according to claim 3, wherein:

the rim has an asymmetrical transverse cross section;

the rim has a tire-receiving channel having a median plane;

the rim has spoke-connecting median plane;

the median plane of the tire-receiving channel is offset in relation to the spoke-connecting median plane laterally toward the second set the spokes lacking a tensioning device.

5. A wheel according to claim 3 wherein:

a first of the pair of spoke-connecting regions of the hub is closer to a transverse center of the hub than a second of the pair of spoke-connecting regions of the hub;

the first set of spokes lacking any adjustable spoke-tensioning device is connected to first of the pair of spoke-connecting regions of the hub.

6. A wheel according to claim 3, wherein:

the spokes of the first set of spokes lacking any adjustable spoke-tensioning device are laced in a radial pattern.

7. A wheel according to claim 3, wherein:

the spokes of the second set of spokes having an adjustable tensioning device are laced in a crossed pattern.

8. A wheel according to 1, wherein:

the spokes of the first set of spokes have an enlarged head at each of their ends and a continuous wire-shaped body between the ends.

9. A wheel according to claim 8, further comprising:

a washer positioned respective ones of the spoke-connecting regions of the hub supporting ones of the enlarged heads of the spokes of the first set of spokes.

10. A wheel according to claim 8, further comprising:

tunneled openings at the spoke-connecting regions of the rim for fastening the spokes;

hollow screws, each hollowed screw having a shouldered collar threadably tightened within respective ones of the tunneled openings;

the enlarged heads of the spokes are connected to the rim by means of said hollow screws.

11. A wheel according to claim 1, further comprising:

a flange for connection to the first set spokes lacking any adjustable spoke-tensioning device, said flange being mounted to fit a first of the pair of laterally spaced-apart spoke-connecting regions of the hub;

the first set of spokes lacking any adjustable spoke-tensioning device being are connected to said flange;

the second set of spokes having an adjustable spoke-tensioning device being are connected to a second of the pair of laterally spaced-apart spoke-connecting regions of the hub.

12. A wheel according to claim 11, wherein:

the flange and the hub are provided with grooves in the spoke-connecting regions for receiving the spokes.

13. A wheel according to claim 1, wherein:

the second set of spokes having an adjustable tensioning device are more steeply inclined, with respect to a median plane of the rim, than the first set of spokes.

14. A wheel according to claim 1, wherein:

the second set of spokes having an adjustable tensioning device are laced in a radial pattern.

15. A wheel according to claim 1, wherein:

each of the spokes of the first and second sets of spokes is in a state of static tension, thereby maintaining the rim in static balance in relation to the hub along axial and radial directions.

16. A wheel according to claim 1, wherein:

the spokes of the first set of spokes extend from the rim to the hub and in a first direction axially outwardly of a median plane of the rim;

the spokes of the second set of spokes extend from the rim to the hub in a direction axially outwardly, and oppositely to said first direction, of the median plane of the rim.

17. A wheel according to claim 1, wherein:

the spokes of the first set of spokes and the spokes of the second set of spokes are connected to the rim at a common spoke-connecting median plane.

18. A wheel according to claim 1, wherein:

all of the spokes of the two sets of spokes are made of non-metallic composite material.

19. A method for manufacturing the bicycle tension wheel of claim 1, the method comprising:

distributing the plurality of spokes into said two sets, the first set of the two sets of spokes lacking any adjustable spoke-tensioning device, and the second set of the two sets of spokes having an adjustable spoke-tensioning device;

assembling the plurality of spokes to the rim and to the hub;

adjusting spoke tension by means of the adjustable tensioning devices of the second set of spokes.

20. A method for manufacturing a wheel according to claim 19, wherein:

said distributing comprises having the second set of spokes having adjustable spoke-tensioning devices constitute one-half of the total number of spokes comprised by the two sets of spokes.

21. A method for manufacturing a wheel according to claim 19, wherein:

said assembling the spokes to the rim and to the hub comprises connecting the spokes to the pair of spoke-connecting regions of the hub in two sets, a first of the two sets being constituted by the spokes of the first set of spokes and a second of the two sets being constituted by the spokes of the second set of spokes.

22. A method according to claim 21, wherein:

ends of the spokes of the two sets are connected to the hub at different distances from a transverse center of the hub;

the first set of spokes is formed by the spokes of the set of spokes whose ends are closer to the center of the hub.

23. A method according to claim 21, wherein:

the rim and the plurality of spokes are made of a non-metallic composite material;

a flange is mounted to fit a first of the pair of laterally spaced-apart spoke-connecting regions of the hub at a radial center of the first set of spokes;

said assembling the spokes to the rim and to the hub comprises:

connecting the first set of spokes lacking any adjustable spoke-tensioning device to said flange;

connecting the second set of spokes having an adjustable spoke-tensioning device to a second of the pair of laterally spaced-apart spoke-connecting regions of the hub.

24. A method for manufacturing a wheel according to claim 19, wherein:

said assembling the spokes to the rim and to the hub comprises connecting the spokes in a crossed pattern to the pair of spoke-connecting regions of the hub in two sets, a first of the two sets being pulling spokes and a second of the two sets being pushing spokes.

25. A method for manufacturing a wheel according to claim 19, wherein:

said adjusting spoke tension comprises maintaining each of the spokes of the first and second sets of spokes in a state of static tension, thereby maintaining the rim in static balance in relation to the hub along axial and radial directions.

26. A method for manufacturing a wheel according to claim 19, wherein:

all of the spokes of the two sets of spokes are made of non-metallic composite material.

27. A method for manufacturing a wheel according to claim 19, wherein:

said distributing comprises having the second set of spokes having adjustable tensioning devices constitute at least approximately one-half of the total number of spokes comprised by the two sets of spokes.

28. A method for manufacturing a wheel according to claim 19, wherein:

said distributing comprises having the second set of spokes having adjustable tensioning devices constitute approximately one-half of the total number of spokes comprised by the two sets of spokes.

29. A method for manufacturing a wheel according to claim 19, wherein:

the assembling of the spokes to the rim and to the hub comprises assembling the spokes so that the spokes of the first set of spokes extend from the rim to the hub and in a first direction axially outwardly of a median plane of the rim, and the spokes of the second set of spokes extend from the rim to the hub in a direction axially outwardly, and oppositely to said first direction, of the median plane of the rim.

30. A method for manufacturing a wheel according to claim 19, wherein:

the assembling of the spokes to the rim comprises connecting the spokes to the rim at a common spoke-connecting median plane.

* * * * *